US012531831B2

(12) United States Patent
Sasaki

(10) Patent No.: US 12,531,831 B2
(45) Date of Patent: Jan. 20, 2026

(54) INFORMATION PROCESSING DEVICE AND INFORMATION PROCESSING METHOD

(71) Applicant: SONY GROUP CORPORATION, Tokyo (JP)

(72) Inventor: Motoki Sasaki, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 18/681,635

(22) PCT Filed: Mar. 4, 2022

(86) PCT No.: PCT/JP2022/009276
§ 371 (c)(1),
(2) Date: Feb. 6, 2024

(87) PCT Pub. No.: WO2023/037591
PCT Pub. Date: Mar. 16, 2023

(65) Prior Publication Data
US 2024/0348580 A1    Oct. 17, 2024

(30) Foreign Application Priority Data
Sep. 8, 2021    (JP) .................. 2021-146346

(51) Int. Cl.
*H04L 61/5007* (2022.01)
*G06Q 50/10* (2012.01)
*H04L 101/69* (2022.01)

(52) U.S. Cl.
CPC ......... *H04L 61/5007* (2022.05); *G06Q 50/10* (2013.01); *H04L 2101/69* (2022.05)

(58) Field of Classification Search
CPC .. H04L 61/5007; H04L 2101/69; G06Q 50/10
(Continued)

(56) References Cited

U.S. PATENT DOCUMENTS 9,026,145 B1 *  5/2015  Duleba .................. H04L 67/52
                                                            455/456.3
2009/0144661 A1 *  6/2009  Nakajima ........... G06F 3/04817
                                                            715/835
(Continued)

FOREIGN PATENT DOCUMENTS

CN      105282708 B  *  6/2019  ............. H04L 51/20
EP          1125415 B1      1/2006
(Continued)

OTHER PUBLICATIONS

International Search Report and Written Opinion of PCT Application No. PCT/JP2022/009276, issued on May 24, 2022, 08 pages of ISRWO.

*Primary Examiner* — Ruolei Zong
(74) *Attorney, Agent, or Firm* — CHIP LAW GROUP

(57) ABSTRACT

Provided is an information processing device (SV) includes a processor (PRS). The processor (PRS) associates a spatio-temporal address (STA) of an object (IN) defined by a position and time of the object (IN) with an Internet address (DI) of the object (IN). The processor specifies the associated spatio-temporal address based on query information, wherein the query information indicates a queried position and a queried time and sends the Internet address associated with the specified spatio-temporal address to an inquirer.

13 Claims, 12 Drawing Sheets

(58) Field of Classification Search
USPC .......................................................... 709/245
See application file for complete search history.

(56) References Cited

U.S. PATENT DOCUMENTS

| | | | |
|---|---|---|---|
| 2012/0220314 A1* | 8/2012 | Altman ................. | H04L 67/306 |
| | | | 455/456.3 |
| 2015/0032905 A1* | 1/2015 | Celebi ................... | H04L 61/103 |
| | | | 709/245 |
| 2015/0244819 A1* | 8/2015 | Duleba ............... | H04L 61/5007 |
| | | | 709/203 |
| 2016/0323241 A1* | 11/2016 | Jones .................... | H04W 4/029 |

FOREIGN PATENT DOCUMENTS

| | | | | |
|---|---|---|---|---|
| EP | 3572913 A1 | 11/2019 | | |
| JP | 2005-006290 A | 1/2005 | | |
| JP | 2014143573 A | * 8/2014 | | |
| JP | 2016-525834 A | 8/2016 | | |
| WO | WO-2021052115 A1 | * 3/2021 | ............. | G06F 16/41 |

* cited by examiner

INFORMATION PROCESSING DEVICE AND INFORMATION PROCESSING METHOD

CROSS REFERENCE TO RELATED APPLICATIONS

This application is a U.S. National Phase of International Patent Application No. PCT/JP2022/009276 filed on Mar. 4, 2022, which claims priority benefit of Japanese Patent Application No. JP 2021-146346 filed in the Japan Patent Office on Sep. 8, 2021. Each of the above-referenced applications is hereby incorporated herein by reference in its entirety.

FIELD

The present invention relates to an information processing device, an information processing method, and a program.

BACKGROUND

As the Internet becomes popular, many people have smartphones and PCs and always use Internet services. In the future, with the popularization of smart glasses and Internet of Things (IoT) devices, the use of Internet services is expected to increase in frequency and depth. However, although communication using an account or a mail address on the Internet is easy, communication with a real world target is not smooth. For example, even if a person in front of you does a good deed, you cannot "like" unless you know the account of the person.

CITATION LIST

Patent Literature

Patent Literature 1: JP 2005-006290 A

SUMMARY

Technical Problem

The reason why communication via the Internet cannot be performed with respect to a person or an object in front of you is that an internet accessible address such as an internet protocol (IP) address or a uniform resource locator (URL) is not necessarily associated with a physical object.

Patent Literature 1 proposes a system that uses information from a monitoring camera or a geographic information system (GIS) to send a message to a person who was at a specific place in the past, is currently at a specific place, or is expected to be at a specific place in the future. However, this is a system in which an area and a target are narrowed down to some extent, such as sending a message from a centralized place such as a disaster prevention center such as a factory to staff of the facility, and is not a general-purpose system that ensures communication between arbitrary terminals in every place on the earth.

Therefore, the present disclosure proposes an information processing device, an information processing method, and a program capable of providing a general-purpose addressing method.

Solution to Problem

According to the present disclosure, an information processing device is provided that comprises a processor that associates a spatio-temporal address of an object defined by a position and a time at which the object exists with an Internet address of the object. According to the present disclosure, an information processing method in which an information process of the information processing device is executed by a computer, and a program for causing a compute to execute the information process of the information processing device are provided.

DESCRIPTION OF EMBODIMENTS

Hereinafter, embodiments of the present disclosure will be described in detail with reference to the drawings. In the following embodiments, the same components are denoted by the same reference signs, and redundant description will be omitted.

Note that the description will be given in the following order.

[1. Overview of Addressing System]
[2. First Embodiment of Addressing System]
[2-1. Spatio-temporal Address]
[2-2. Collation Information]
[2-3. Collation Method of Spatio-temporal Address with Collation Information]
[2-4. Another Example of Collation Method]
[2-5. System Configuration Example]
[2-6. Description of Information Processing]
[3. Second Embodiment of Addressing System]
[3-1. System Configuration Example]
[3-2. Description of Information Processing]
[4. Examples]
[4-1. Example 1]
[4-2. Example 2]
[4-3. Example 3]
[4-4. Example 4]
[4-5. Example 5]
[4-6. Example 6]
[5. Effects]

1. OVERVIEW OF ADDRESSING SYSTEM

The present disclosure relates to a method of assigning addresses on the Internet to all objects and behaviors.

"Object" includes both physical and virtual objects. Physical objects include devices and people that are real. Virtual objects include augmented reality (AR) objects and virtual reality (VR) objects. "Behavior" means a behavior performed by an object (subject of behavior) connected to the Internet.

The addressing system AS of the present disclosure utilizes the physical principle that "objects cannot exist at the same time at the same position in an overlapping manner", and utilizes information that "an object existing at this time at this position" as a unique identifier. The object is identified on the basis of spatio-temporal information about the time and space at which the object is present. A general-purpose addressing method is thus provided. Hereinafter, the identifier of the object defined by the position and time at which the object exists is referred to as a "spatio-temporal address".

Addressing system AS of the present disclosure associates the physical space and the virtual space with the Internet space by associating the spatio-temporal address of the object with the Internet address (such as IP address) of the object. Therefore, a nearby or remote object can be directly accessed through the Internet through the spatio-temporal address. Hereinafter, a specific mode of the addressing system AS will be described.

2. FIRST EMBODIMENT OF ADDRESSING SYSTEM

Figure 1:
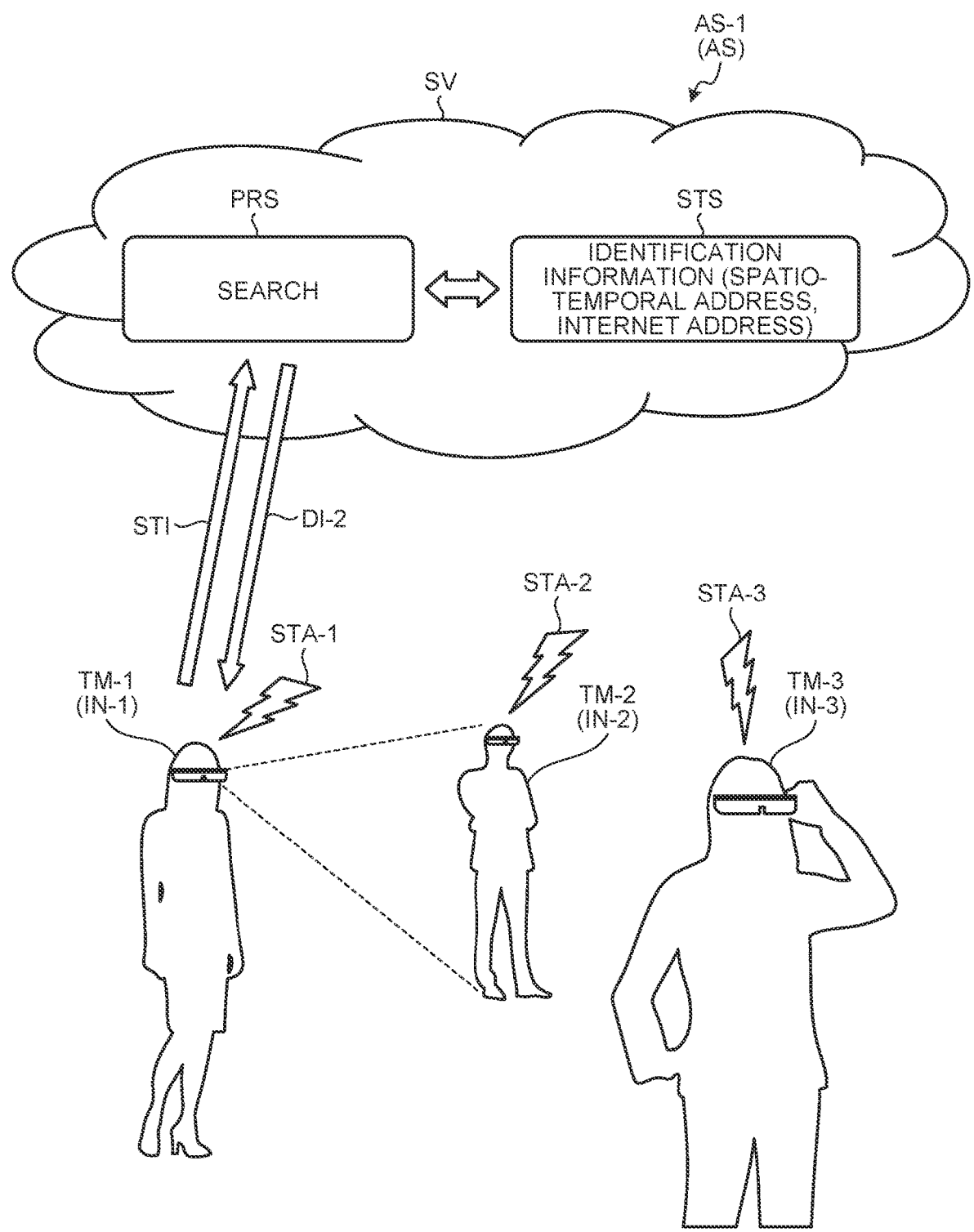
FIG. 1 is a diagram illustrating an addressing system according to a first embodiment.

FIG. 1 is a diagram illustrating an addressing system AS-1 according to a first embodiment.

The addressing system AS-1 collectively manages the identification information of all the objects IN by the centralized server SV. The identification information includes a spatio-temporal address STA and an Internet address DI. Each object IN registers its own Internet address DI in the storage STS of the server SV. In addition, each object IN constantly monitors its own spatio-temporal address STA and continues to transmit it to the server SV. The addressing system AS-1 registers the spatio-temporal address STA and the Internet address DI in association with each other in the storage STS for each object IN.

In the example of FIG. 1, the object IN is a person who possesses the terminal TM. The terminal TM is, for example, a terminal having a camera function, a position detection function, and a communication function, such as a smartphone, AR glasses, and a head mounted display (HMD).

For example, the Internet address DI of the object IN is defined as the Internet address of the terminal TM. The position POS (see FIG. 2) of the object IN is defined as the position of the terminal TM or the occupied space OS (see FIG. 2) of the object IN including the position of the terminal TM. In FIG. 1, the individual objects IN and the individual terminals TM are distinguished by the numbers appended after the reference signs. Constitutive elements associated with each object IN and each terminal TM, such as a spatio-temporal address STA and an internet address DI, are distinguished in a similar manner.

When the object IN-1 tries to acquire the Internet address DI-2 of the object IN-2 existing at a certain position at a certain time, the object IN-1 generates the spatio-temporal information of the object IN-2 as the query information STI using the terminal TM-1. The query information STI includes information related to a queried position SPOS (see FIG. 2) and a queried time. The queried position SPOS means a position of the object IN-2 generated by using the camera function and the position detection function of the terminal TM-1. The queried time means a time at which the object IN-2 occupies the queried position SPOS.

For example, the terminal TM-1 detects the position of the terminal TM-1 using a position detection function such as a global positioning system (GPS). The terminal TM-1 captures an image of the object IN-2 using the camera function, analyzes the captured image, and detects a relative positional relationship between the terminal TM-1 and the object IN-2. The terminal TM-1 detects the position of the object IN-2 using the position of the terminal TM-1 and the relative positional relationship between the terminal TM-1 and the object IN-2. The terminal TM-1 acquires the position of the detected object IN-2 or a search space SS (see FIG. 2) having a predetermined size including the position as the queried position SPOS.

The object IN-1 transmits the generated query information STI to the server SV via the communication function of the terminal TM-1. The server SV matches, by using the processor PRS, the query information STI with the spatio-temporal address STA of the object IN in the vicinity of the queried position SPOS that is registered in the storage STS. The processor PRS identifies the spatio-temporal address STA-2 of the object IN-2 indicating the query information STI on the basis of the matching result. The processor PRS transmits the Internet address DI-2 of the object IN-2 associated with the identified spatio-temporal address STA-2 to the object IN-1 that is the inquirer.

Similarly, when the object IN-1 tries to acquire the Internet address DI-2 of the object IN-2 that acts at a certain time and at a certain position, the object IN-1 generates spatio-temporal information indicating the time and space in which the behavior is performed as the query information STI using the terminal TM-1.

The object IN-1 transmits the generated query information STI to the server SV. The server SV matches, by using the processor PRS, the query information STI with the spatio-temporal address STA of the object IN in the vicinity of the queried position SPOS that is registered in the storage STS. The processor PRS identifies the spatio-temporal address STA-2 of the object IN-2 indicating the query information STI on the basis of the matching result. The processor PRS transmits the Internet address DI-2 of the object IN-2 associated with the identified spatio-temporal address STA-2 to the object IN-1 that is the inquirer.

2-1. Spatio-Temporal Address

Figure 2:
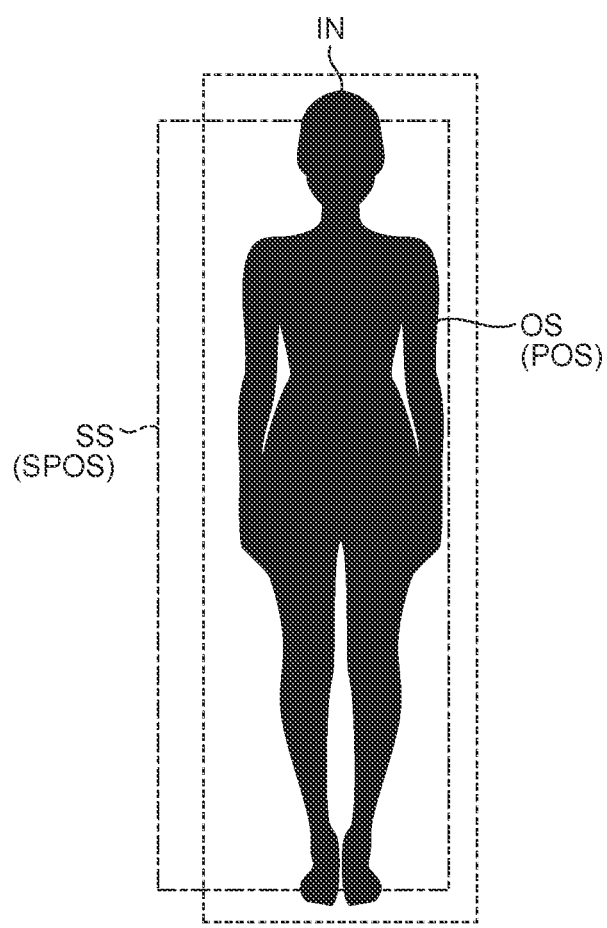
FIG. 2 is a diagram illustrating an example of a method of defining a spatio-temporal address.

FIG. 2 is a diagram illustrating an example of a method of defining a spatio-temporal address STA.

The spatio-temporal address STA of the object IN includes information on the position POS of the object IN for each time. The position POS of the object IN is defined as a measurement position of the object IN measured by a sensor such as a GPS or an occupied space OS of the object IN including the measurement position. In the example of FIG. 2, a space having a predetermined size based on the height, width, and depth of the object IN is calculated as the occupied space OS of the object IN. The information about the size of the occupied space OS is registered for each object IN. The processor PRS acquires the position POS at which the object IN exists as the occupied space OS having a predetermined size including the measurement position.

2-2. Collation Information

The collation information STI is spatio-temporal information detected by the inquirer about the object IN or the behavior to be inquired. The collation information STI includes information about an object IN to be queried at a queried time or a queried position SPOS occupied by a behavior of the object IN. The queried position SPOS is defined as an estimated position of the object IN estimated on the basis of the sensor information of the inquirer or a search space SS having a predetermined size including the estimated position. In the example of FIG. 2, a space having a predetermined size designated by the inquirer on the basis of the size of the object IN is calculated as the search space SS. The processor PRS acquires the queried position SPOS as the search space SS having a predetermined size including the position designated by the inquirer.

2-3. Collation Method of Spatio-Temporal Address with Collation Information

The processor PRS performs matching on the basis of a matching degree between the position POS indicated by the spatio-temporal address and the queried position SPOS. When the matching degree satisfies the predetermined allowable criterion, the processor PRS determines that the spatio-temporal address STA related to the position POS corresponds to the queried position SPOS.

The matching degree is determined because the position POS and the queried position SPOS do not necessarily completely match. For example, in the example of FIG. 1, the queried position SPOS is estimated on the basis of the sensor information of the object IN-1 (terminal TM-1) as the inquirer. The position POS of the object IN-2 to be queried is detected using the position detection function of the object IN-2 (terminal TM-2) itself. Therefore, the queried position SPOS does not necessarily coincide with the position POS of the object IN-2 indicated by the spatio-temporal address STA-2.

For example, the processor PRS determines a spatio-temporal address STA that includes, in the occupied space OS, the queried position SPOS at the queried time as the spatio-temporal address STA indicated by the queried position SPOS and the queried time. In a case where the queried position SPOS is presented as the search space SS having a predetermined size, the spatio-temporal address STA is specified on the basis of the ratio of the search space SS included in the occupied space OS. For example, when the proportion of the search space SS included in the occupied space OS satisfies a predetermined acceptance criterion, the processor PRS determines that the search space SS is included in the occupied space OS, that is, the matching degree satisfies the acceptance criterion.

2-4. Another Example of Collation Method

Figure 3:
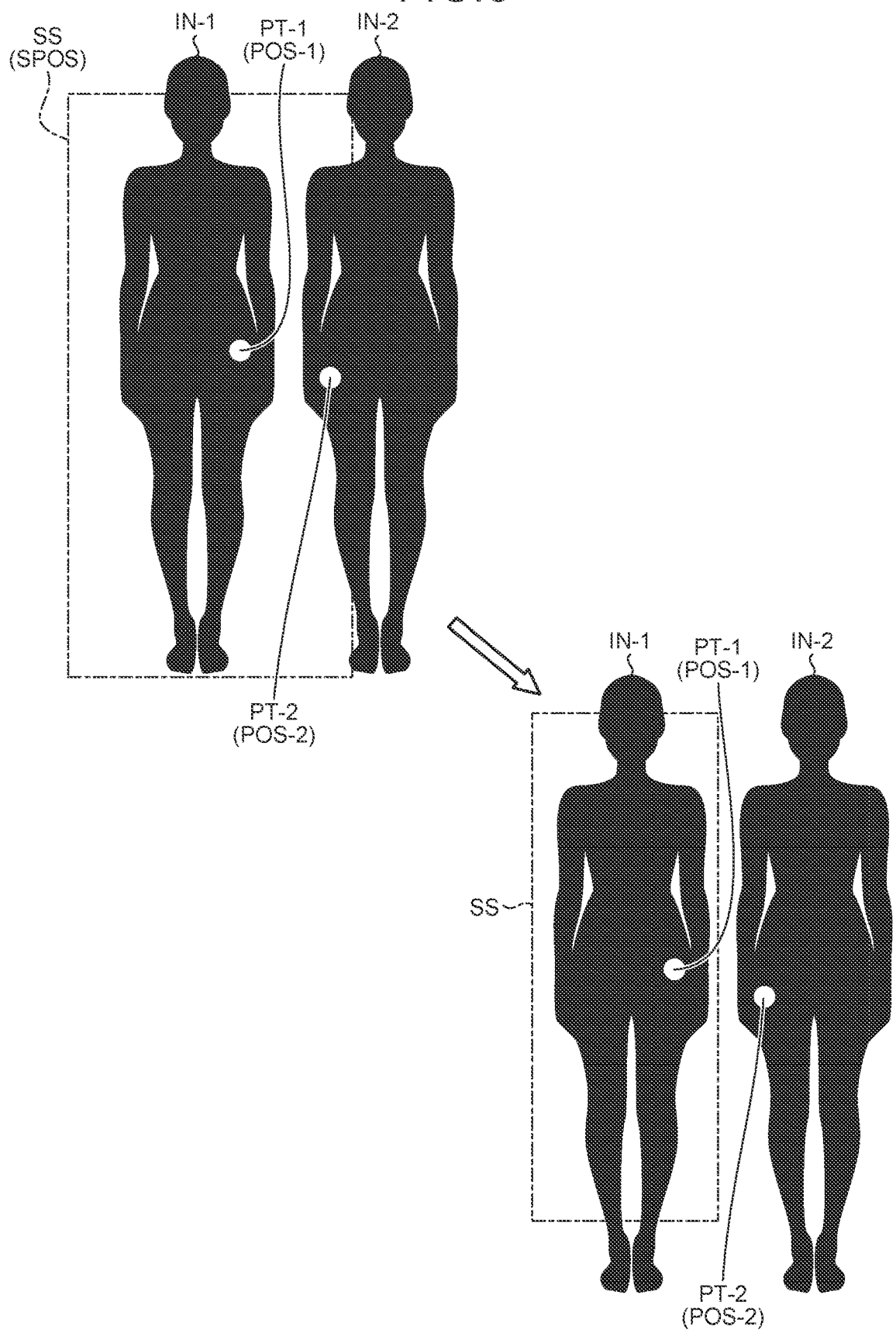
FIG. 3 is a diagram illustrating another example of the collation method.

FIG. 3 is a diagram illustrating another example of the collation method.

In the example of FIG. 3, the position POS is defined as the position of the point PT on the object IN. For example, the point PT indicates the position of the terminal TM detected using the position detection function of the terminal TM. The processor PRS searches for the spatio-temporal address STA corresponding to the point PT included in the search space SS.

The inquirer designates the search space SS substantially including the target object IN-1. However, if another object IN-2 exists near the target object IN-1, a point PT-2 indicating the spatio-temporal address STA-2 of the object IN-2 may be included in the search space SS.

In this case, the processor PRS specifies the spatio-temporal address STA-1 while adjusting the size of the search space SS such that only a single spatio-temporal address STA is searched for from the search space SS on the basis of the user input information of the inquirer. Alternatively, the processor PRS specifies one spatio-temporal address STA-1 selected on the basis of the user input information of the inquirer from the plurality of spatio-temporal addresses STA-2 and STA-1 retrieved from the search space SS as the queried position SPOS and the spatio-temporal address STA indicated by the queried time.

2-5. System Configuration Example

Figure 4:
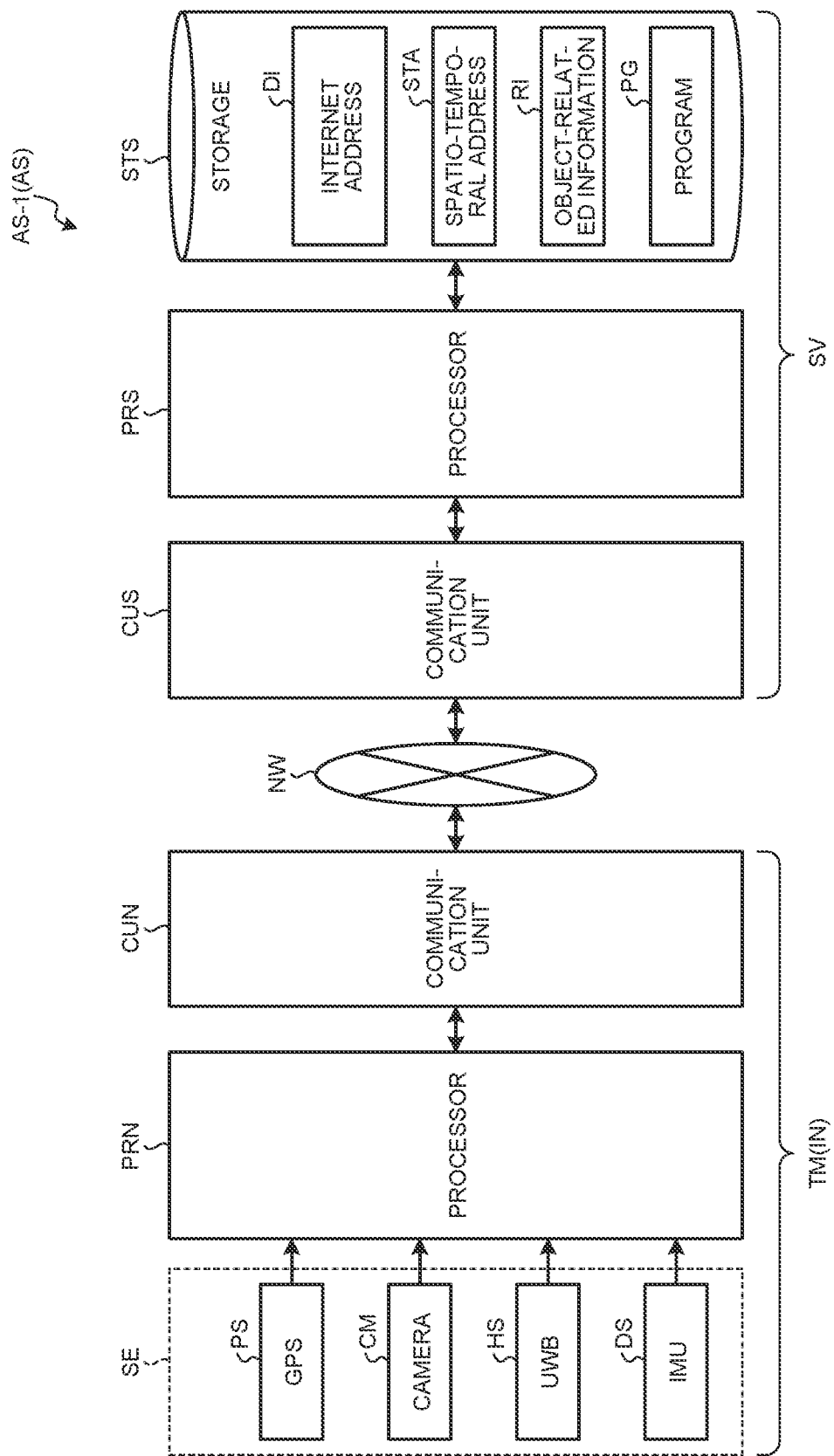
FIG. 4 is a diagram illustrating an example of a configuration of an addressing system.

FIG. 4 is a diagram illustrating an example of a configuration of the addressing system AS-1.

The addressing system AS-1 includes a server SV and a terminal TM. The terminal TM and the server SV are connected via a network NW.

The terminal TM includes a processor PRN, a communication unit CUN, and a sensor unit SE. The terminal TM performs space recognition processing on the basis of the sensor information detected by the sensor unit SE. The space recognition processing is performed using a space recognition technology such as simultaneous localization and mapping (SLAM) or a visual positioning system (VPS). The terminal TM generates spatio-temporal information on the basis of the position information detected on the basis of the space recognition processing, and transmits the spatio-temporal information to the server SV.

For example, the sensor unit SE includes a position sensor PS, a camera CM, a distance sensor HS, and an inertial sensor DS. The position sensor PS detects the position of the terminal TM using the GPS. The camera CM captures an image of the outside world. The distance sensor HS detects the distance to the object using UWB (Ultra Wide Band). The inertial sensor DS detects the direction and magnitude of the acceleration for each time using an inertial measurement unit (IMU).

In the present disclosure, visual SLAM is used as the SLAM technique used for the space recognition processing, but the SLAM technique is not limited thereto. For example, the space recognition processing may be performed using the LiDAR SLAM method. Furthermore, the configuration of the sensor unit SE described above is an example, and the type of the sensor included in the sensor unit SE is not limited to the above.

The processor PRN monitors, by using the SLAM, a position POS of an object IN that holds the terminal TM. The processor PRN combines the information of the time when the object IN occupies the position POS with the information of the position POS to generate the spatio-temporal address STA of the object IN. The processor PRN repeats the generation processing of the spatio-temporal address STA at a determined timing and continues to transmit the same to the server SV via the communication unit CUN. The server SV updates the spatio-temporal address STA registered in the storage STS as needed on the basis of the received spatio-temporal address STA.

The processor PRN estimates the queried position SPOS of another object IN (the object IN to be queried) specified by the user input information. For example, the processor PRN estimates the queried position SPOS of the other object IN using the information on the position POS and the attitude of the local device (the terminal TM to which the processor PRN belongs) calculated using the SLAM and the information on the distance to the other object IN detected by the distance sensor HS. The processor PRN combines the information of the time when the other object IN occupies the queried position SPOS with the information of the queried position SPOS, to generate the query information STI of the other object IN. The processor PRN transmits the generated query information STI to the server SV via the communication unit CUN to make an inquiry.

Similarly, the processor PRN estimates a queried position SPOS of a behavior (behavior to be queried) designated by the user input information. For example, the processor PRN estimates the queried position SPOS using the information regarding the position POS and the attitude of the processor PRN and the information on the distance to the position where the behavior is performed (for example, the object IN that is the subject of the behavior). The processor PRN generates the query information STI by combining the information of the time when the behavior to be queried occupies the queried position SPOS with the information of the queried position SPOS. The processor PRN transmits the generated query information STI to the server SV via the communication unit CUN to make an inquiry.

The server SV includes a processor PRS, a communication unit CUS, and a storage STS. The server SV is an information processing device that processes various types of information. The server SV registers and manages identification information of any object IN in the storage STS. The server SV updates the identification information of the storage STS as needed on the basis of the spatio-temporal address of the object IN that is constantly transmitted. In response to the inquiry based on the query information STI, the server SV extracts the Internet address DI of the corresponding object IN from the storage STS and transmits the Internet address DI to the inquirer.

The information processing of the server SV is performed by the processor PRS. For example, the processor PRS associates the spatio-temporal address STA of the object IN defined by the position POS and the time at which the object IN is present with the Internet address DI of the object IN. The processor PRS determines the queried position SPOS and the spatio-temporal address STA indicated by the queried time. The processor PRS transmits the Internet address DI associated with the specified spatio-temporal address STA to the inquirer via the communication unit CUS.

Various pieces of information used for the processing of the processor PRS are stored in the storage STS. For example, the storage STS stores the Internet address DI and the spatio-temporal address STA as identification information of the object IN.

In addition to the identification information, various pieces of information related to the object IN are stored in the storage STS as the object-related information RI. The object-related information includes any information published for the object IN. For example, in a case where the object IN is an object related to a commercial facility, a public facility, or the like, the object-related information RI includes information (use information) related to a use method of the facility related to the object. For example, for an object IN related to a department store or a shopping center, information such as a guide map of a facility or opening hours can be exemplified as the use information. For an object IN related to transportation such as a train or a bus, information such as route information and a timetable can be exemplified as the use information.

The object-related information RI is registered in association with the identification information of the object IN. For example, the processor PRS determines the queried position SPOS and the spatio-temporal address STA indicated by the queried time. The processor PRS sends the object-related information RI of the object IN with the Internet address DI associated with the identified spatio-temporal address STA to the inquirer.

The storage STS also stores information regarding settings, conditions, and criteria used for various calculations, and a program PG for executing various calculations. The program PG is a program that causes a computer (the processor PRS and a memory, such as a random access memory (RAM) and a read only memory (ROM), connected to the processor PRS) to execute the information processing according to the present disclosure.

The processor PRS performs various processing according to the program PG stored in the storage STS. The storage STS may be used as a work area for temporarily storing a processing result of the processor PRS.

The storage STS includes any non-transitory storage medium such as, for example, a semiconductor storage medium and a magnetic storage medium. The storage STS includes, for example, an optical disk, a magneto-optical disk, or a flash memory. The program PG is stored in, for example, a non-transitory computer-readable storage medium.

The communication unit CUN and the communication unit CUS perform wireless communication via the network NW. As the communication standard, for example, a wireless local area network (LAN) such as WiFi (registered trademark) and a fifth generation mobile communication system (5G) is used.

2-6. Description of Information Processing

Figure 5:
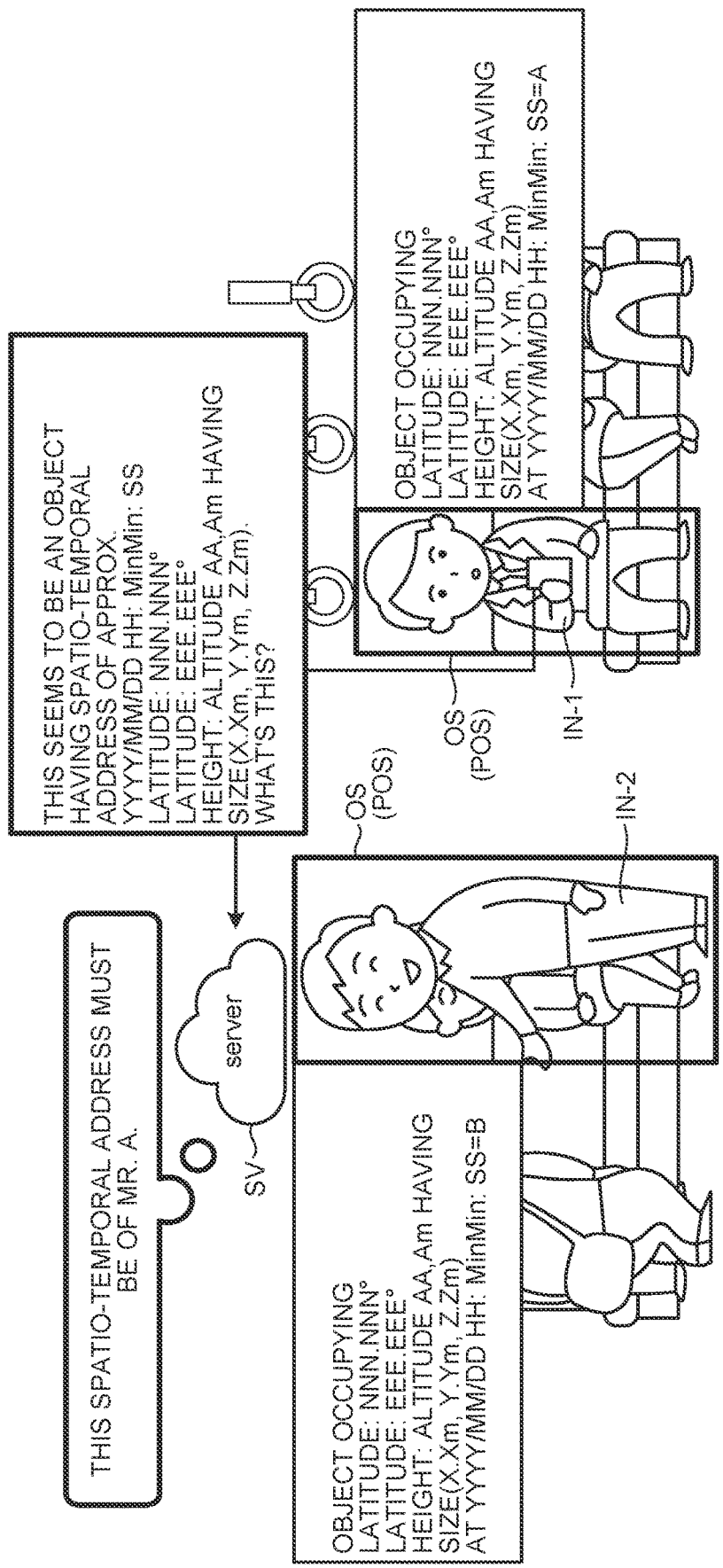
FIG. 5 is a diagram illustrating an example of information processing.

FIG. 5 is a diagram illustrating an example of information processing.

The object IN-1 and the object IN-2 respectively upload their absolute positions and occupied spaces to the server SV on a real-time basis. The object IN-1 estimates the position SPOS (search space SS) of the object IN-2 using the relative positional relationship between the object IN-1 and the object IN-2 and the information on the size of the object IN-2 estimated from the camera image.

The object IN-1 generates the query information STI by adding the time stamp of the measured time to the estimated position SPOS of the object IN-2. The object IN-1 uploads the query information STI to the server SV, and queries the server SV for which the object corresponds to the query information STI.

The server SV searches for the object IN-2 corresponding to the query information STI from a large number of objects IN managing the identification information. Then, the server SV transmits the Internet address DI-2 of the object IN-2 obtained by the search to the object IN-1. The object IN-1 sends a message to the object IN-2 using the received internet address DI-2.

3. SECOND EMBODIMENT OF ADDRESSING SYSTEM

Figure 6:
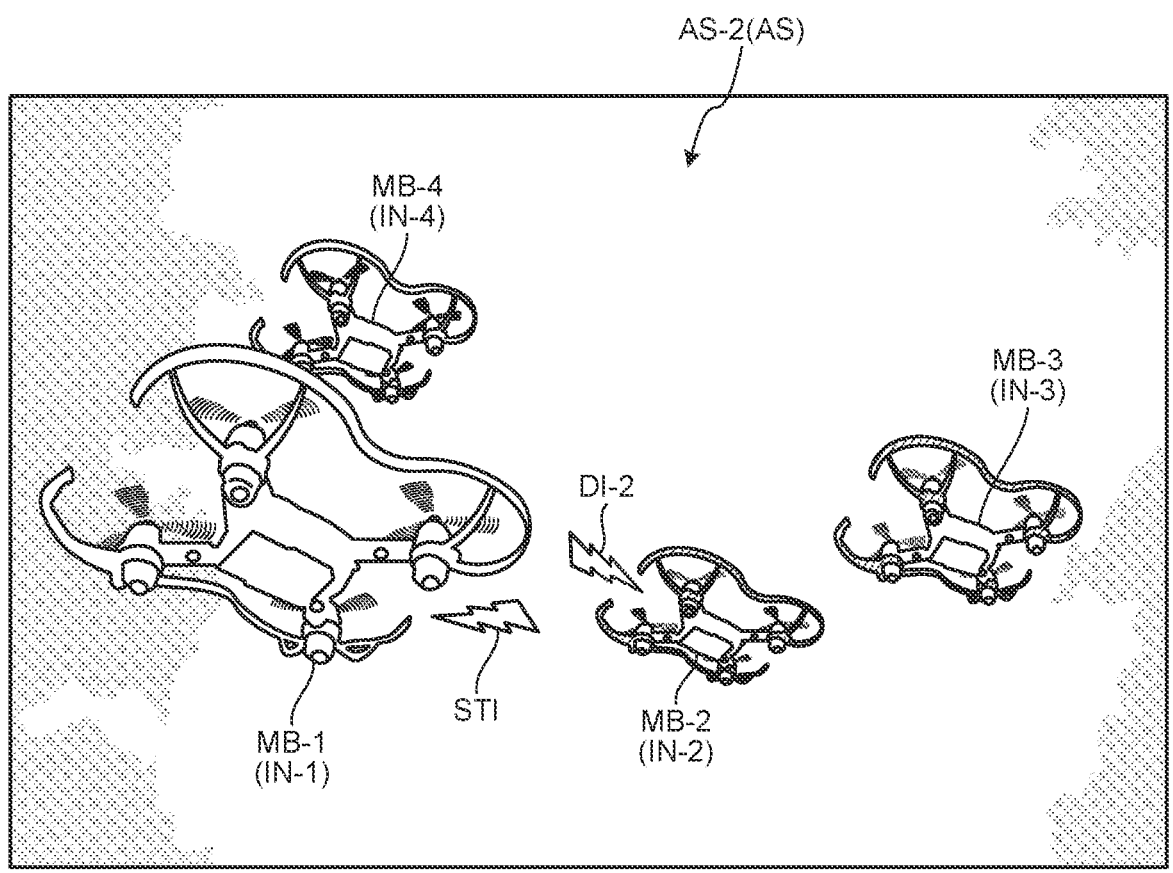
FIG. 6 is a diagram illustrating an addressing system according to a second embodiment.

FIG. 6 is a diagram illustrating an addressing system AS-2 according to the second embodiment. Hereinafter, differences from the first embodiment will be mainly described.

The present embodiment is different from the first embodiment in that the object IN serving as the inquirer individually presents the query information STI to the surrounding objects IN without passing through the server SV to make an inquiry. The addressing system AS-2 does not have a centralized server SV that collectively manages the identification information of the object IN. The identification information (spatio-temporal address STA, Internet address DII) of the object IN is individually managed by the object IN itself.

In the example of FIG. 6, the object IN is a moving body MB such as a drone. The object IN itself functions as an information processing device that performs information processing related to addressing. However, similarly to the first embodiment, the information processing of the present embodiment can also be applied to a system in which a person holding the terminal TM is the object IN. In this case, the terminal TM functions as an information processing device that performs information processing related to addressing.

3-1. System Configuration Example

Figure 7:
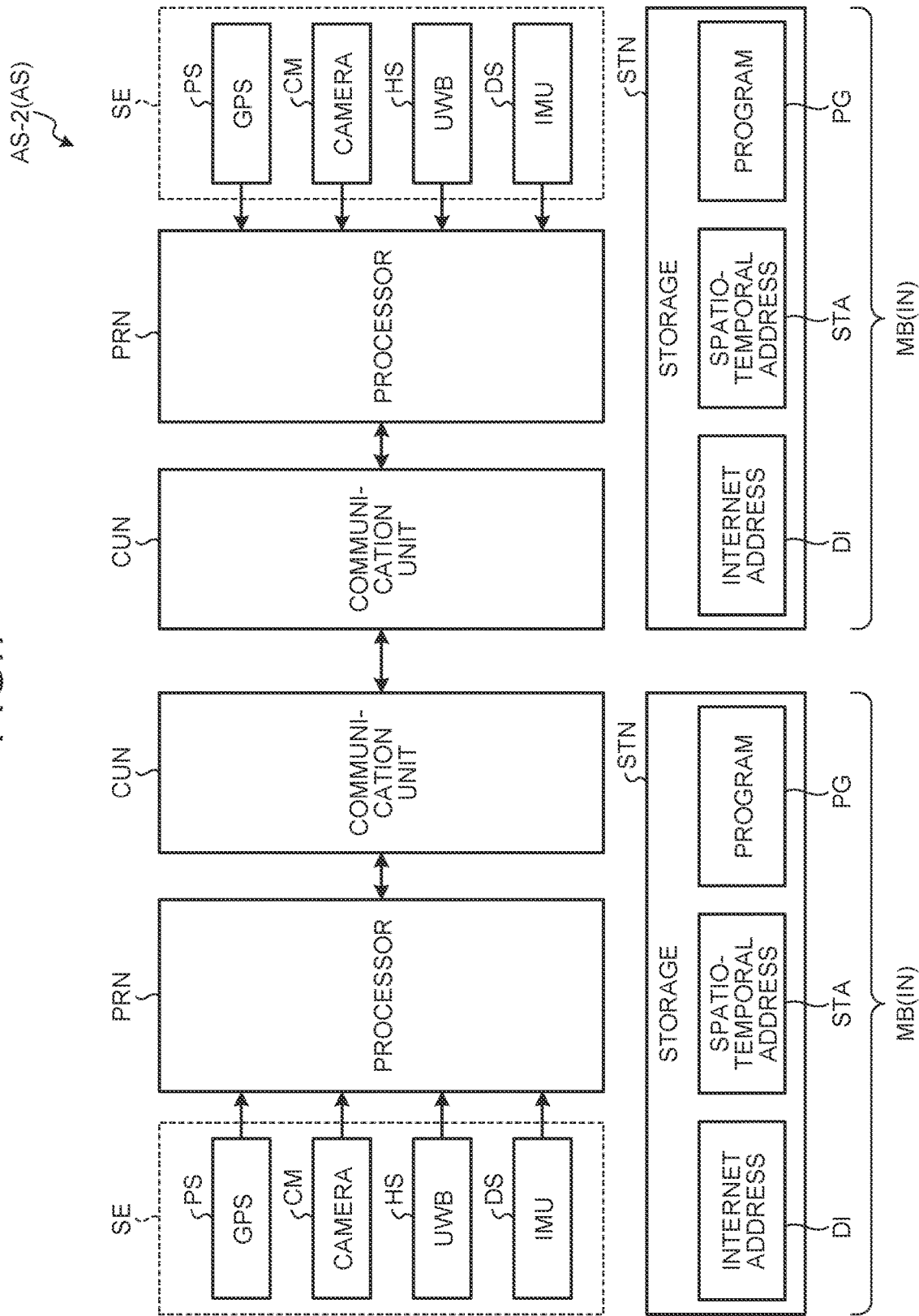
FIG. 7 is a diagram illustrating an example of a configuration of the addressing system.

FIG. 7 is a diagram illustrating an example of a configuration of the addressing system AS-2.

The objects IN communicate with each other using a short-range wireless communication technology such as Bluetooth (registered trademark). Each object IN includes a storage STN that manages identification information. The object IN registers and manages its own identification information in its own storage STN. The processor PRN repeats the generation processing of the spatio-temporal address STA of the object IN to which the processor PRN belongs at a determined timing. The processor PRN updates the spatio-temporal address STA registered in the storage STN at any time on the basis of the generated spatio-temporal address STA. The processor PRN associates the updated spatio-temporal address STA with the Internet address DI of the object IN.

The inquiry about the spatio-temporal address STA is directly performed between the objects IN without going through the server SV. For example, in FIG. 6, when an object IN-1 attempts to communicate with another object IN-2 present at a location at a certain time, the object IN-1 identifies the queried position SPOS and the queried time of the object IN-2 to generate the query information STI. The object IN-1 transmits the generated query information STI directly to the nearby object IN via the communication unit CUN.

Similarly, when an object IN-1 attempts to communicate with another object IN-2 that acts at a location at a certain time, the object IN-1 identifies the position and the time at which the behavior was taken (the queried position SPOS and the queried time) to generate the query information STI. The object IN-1 transmits the generated query information STI directly to the nearby object IN via the communication unit CUN.

Upon receiving the query information STI, the processor PRN of the nearby object IN-2 matches the query information STI with the spatio-temporal address STA registered in the storage STS. When the queried position SPOS and the queried time indicate the spatio-temporal address STA of the object IN-2 to which the processor PRN belongs, the processor PRN sends the Internet address associated with the spatio-temporal address STA to the object IN-1 that is an inquirer. The processor PRN communicates with the object IN-1 that is the inquirer via the Internet address DI-2 of the object IN-2 thus sent.

3-2. Description of Information Processing

Figure 8:
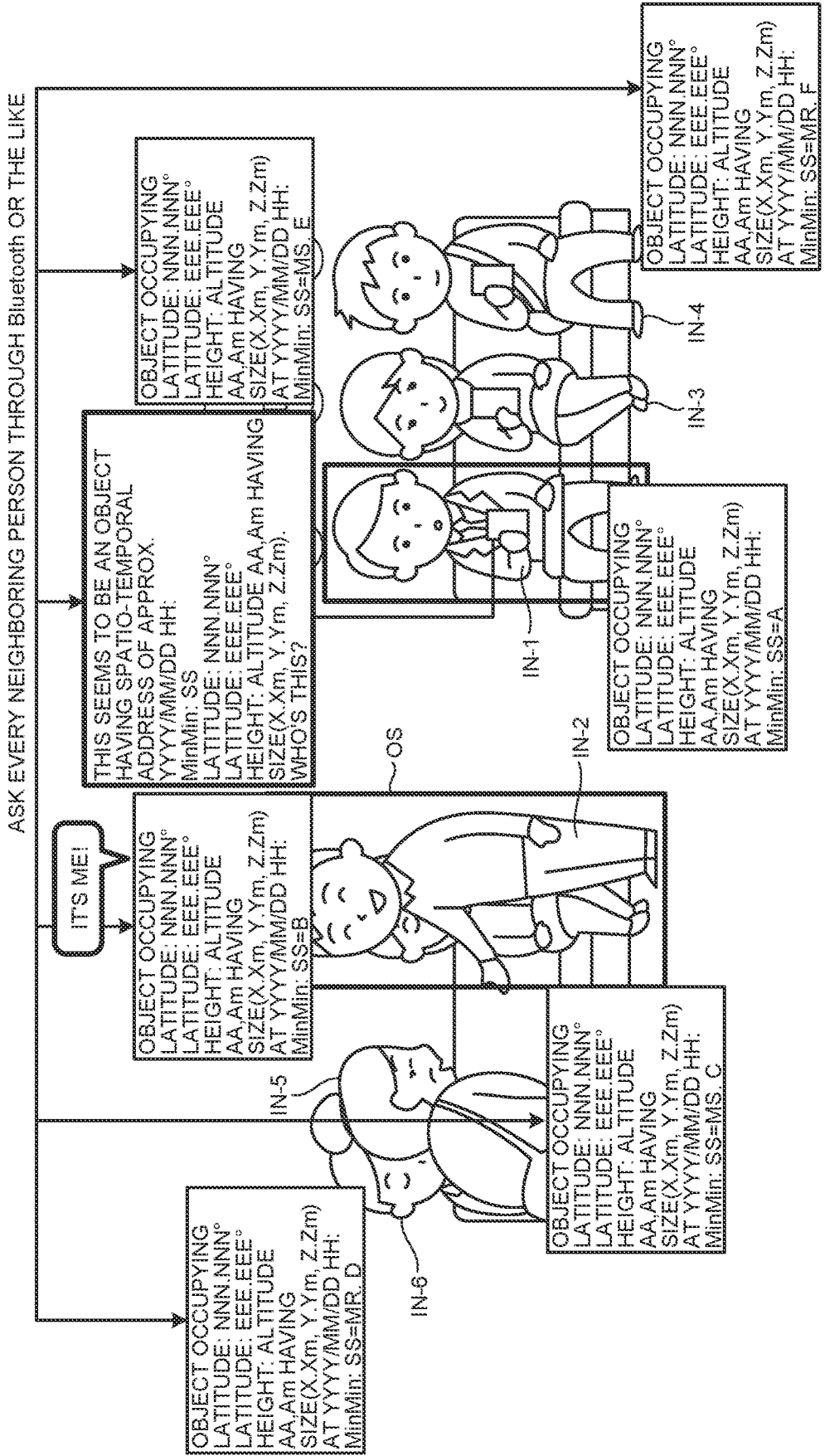
FIG. 8 is a diagram illustrating an example of information processing.

FIG. 8 is a diagram illustrating an example of the information processing.

The objects IN-1 and IN-2 monitor their absolute position and their occupied space, respectively, on a real-time basis. The object IN-1 estimates the position SPOS (search space SS) of the object IN-2 using the relative positional relationship between the object IN-1 and the object IN-2 and the information on the size of the object IN-2 estimated from the camera image.

The object IN-1 generates the query information STI by adding the time stamp of the measured time to the estimated position SPOS of the object IN-2. The object IN-1 transmits the query information STI to all the nearby objects IN by near field communication, and retrieves whether there is an object corresponding to the query information STI.

Each object IN that has received the query information STI determines whether its own spatio-temporal address STA corresponds to the query information STI. The object IN-2 having the spatio-temporal address STA corresponding to the query information STI sends its own internet address DI-2 to the object IN-1 that is the inquirer. The object IN-1 sends a message to the object IN-2 using the received internet address DI-2.

4. EXAMPLES

Hereinafter, an embodiment of the addressing system AS will be described. The following embodiment is an application example of the addressing system AS of any one of the first and second embodiments described above.

4-1. Example 1

Figure 9:
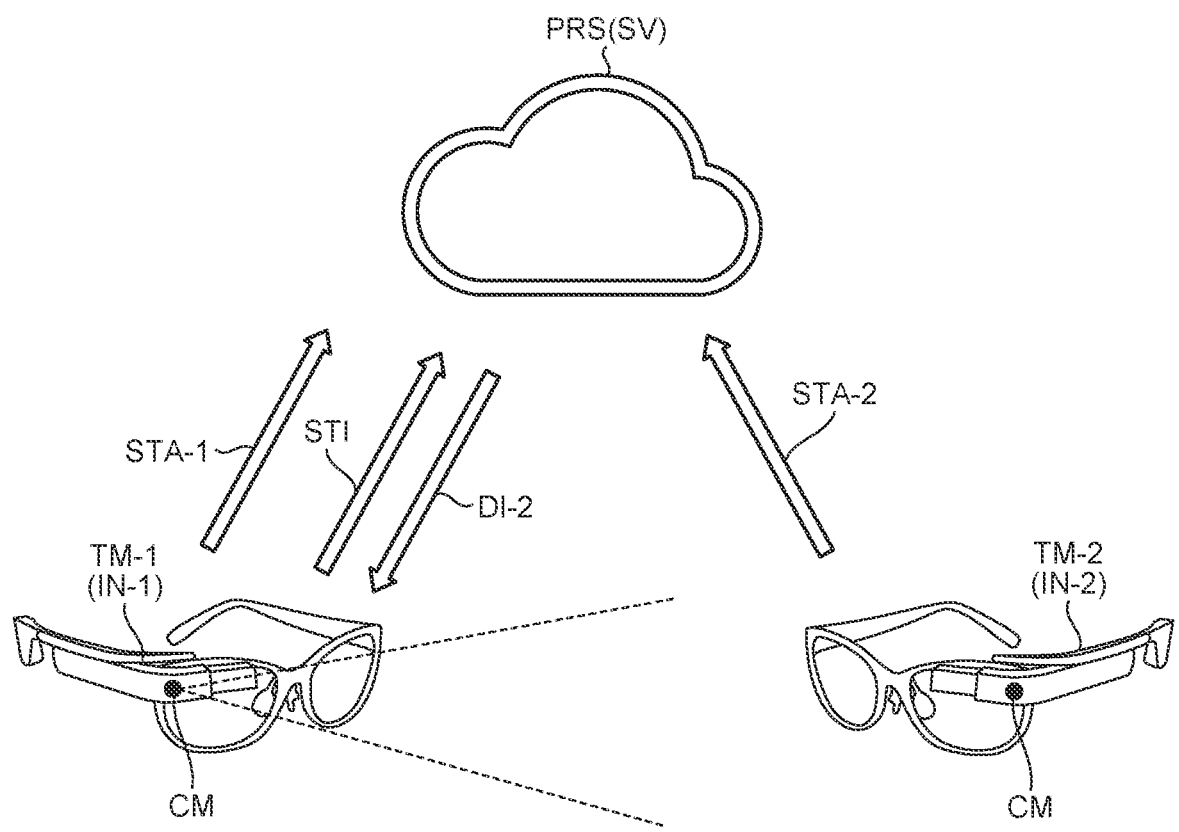
FIG. 9 is an explanatory diagram of Example 1.

FIG. 9 is an explanatory diagram of Example 1.

In FIG. 9, two users wearing smart glasses (terminal TM) are shown as the object IN-1 and the object IN-2. The camera CM of the smart glasses always captures what the wearer sees. The smart glasses can estimate the own position always highly accurately by the VPS using the captured image. The smart glasses can grasp the position (latitude, longitude, height) of its own accurate absolute coordinate system on the basis of its own position.

In such a situation, the object IN-1 sees the object IN-2 "giving up the seat to an old woman" on a bench in a park, for example. The object IN-1 wants to "like" that good deed of the object IN-2. The object IN-1 looks at the object IN-2 with the smart glasses to extract the relative positional relationship between the object IN-1 and the object IN-2 (the position where the behavior is performed) and the information on the size of the object IN-2 (the size of the space where the behavior is performed) estimated from the camera image. The object IN-1 estimates the position where the behavior is performed on the basis of the extracted information, and generates the query information STI.

The object IN-1 makes an inquiry to the server SV on the basis of the query information STI, and acquires the Internet address DI-2 of the object IN-2 that is the subject of the behavior. The object IN-1 traces back the visual log of the smart glasses, counts the time between "speaking to the old lady and giving up his/her seat" and sends a "like" message to the deed. The object IN-2 receives the "like" message from an anonymous person.

In the above method, the names and the like are not exchanged between the objects IN. Since communication can be performed only with spatio-temporal information such as "a person in front of the user" or "a behavior performed in front of the user", highly anonymous communication is achieved.

4-2. Example 2

Figure 10:
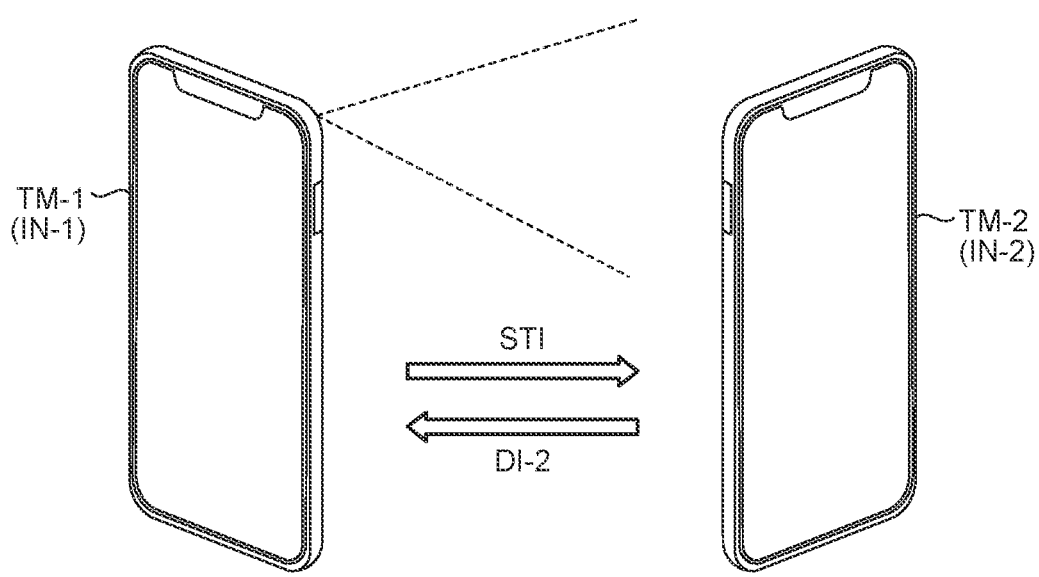
FIG. 10 is an explanatory diagram of Example 2.

FIG. 10 is an explanatory diagram of Example 2.

In FIG. 10, two users holding smartphones (terminals TM) are illustrated as the object IN-1 and the object IN-2. The smartphones store relative positions with respect to neighboring smartphones for a certain period of time.

The object IN-1 sees a criminal act of the object IN-2 and captures the scene of the criminal act. The photograph has a time stamp. Although the absolute positions of the object IN-1 and the object IN-2 are not known, the relative positional relationship between them is known with high accuracy. The object IN-1 taps on the person in the captured image. The position occupied by the object IN-2 can be relatively determined by the image recognition technology. The object IN-1 has generated the query information STI by adding the timestamp of the photograph to the position of the object IN-2.

The object IN-1 transmits the query information STI to all the nearby objects IN by using near field communication, and queries whether there is an object IN having a spatio-temporal address STA corresponding to the query information STI. The spatio-temporal address STA-2 of the object IN-2 is found and the object IN-1 obtains the internet address DI-2 of the object IN-2. The object IN-1 reports the internet address DI-2 of the object IN-2 and the photograph of the scene of the criminal act as evidence that the object IN-2 has committed the criminal act.

In the above method, the face of the object IN-2 does not need to be shown in the captured photograph. Therefore, the object IN-1 can report the object IN-2 furtively.

4-3. Example 3

Figure 11:
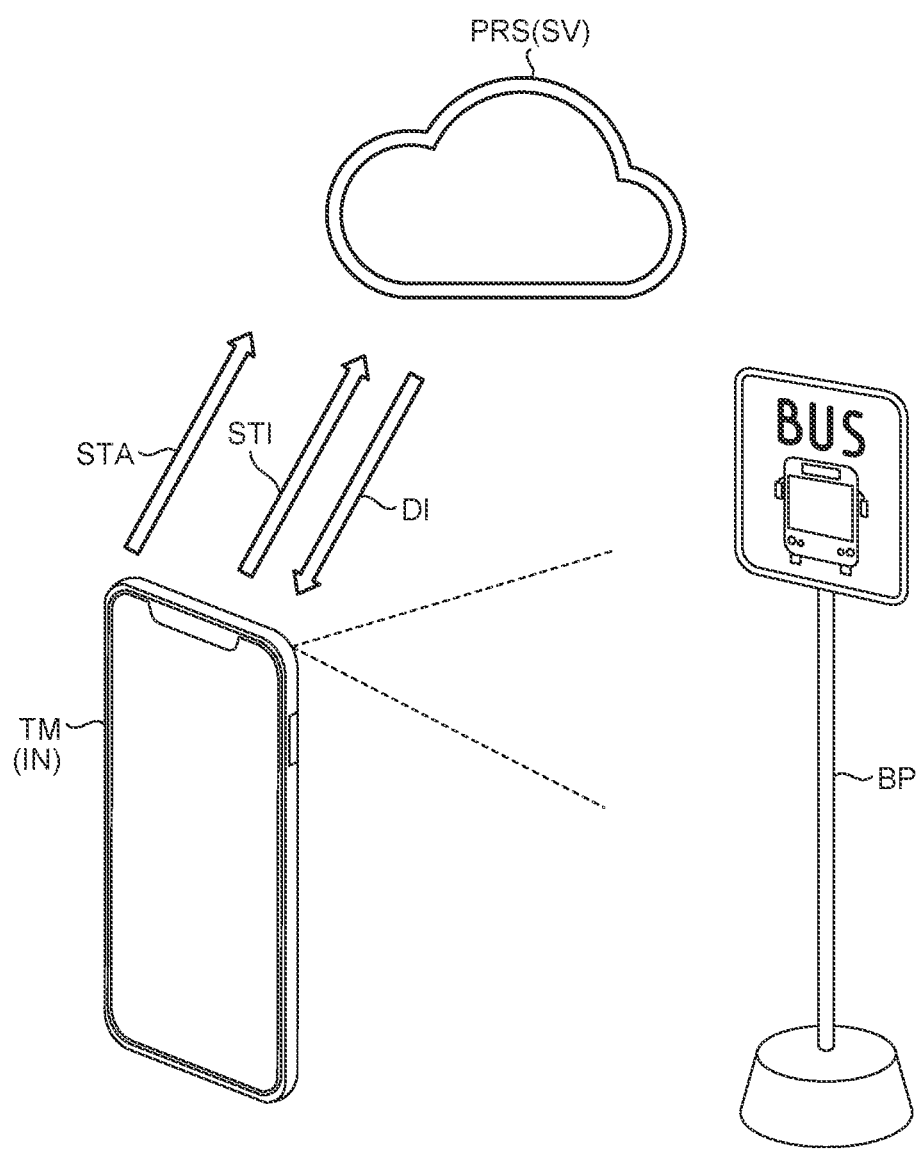
FIG. 11 is an explanatory diagram of Example 3.

FIG. 11 is an explanatory diagram of Example 3.

FIG. 11 illustrates a state in which a bus user (object IN) captures an image of a bus stop BP (object IN) with a smartphone (terminal TM). The bus company knows which position is occupied by each bus stop BP. The smartphone can estimate an accurate current position using the VPS by capturing a scene with the camera CM.

The smartphone obtains the space (search space SS) occupied by the bus stop BP using the image recognition AI, and generates the query information STI. Since the bus stop BP is a static object whose position does not change, it is not necessary to include the queried time in the query information STI.

The object IN transmits the query information STI to the server SV of the bus company, and inquires which bus stop BP has the spatio-temporal address STA corresponding to the query information STI. Since the bus company manages the space occupied by the bus stop, in response to the inquiry, the Internet address DI of the corresponding bus stop and the current position (object-related information) of the bus that will stop at the bus stop in the future are returned. The object IN recognizes the current position of the bus to take, and notices that it is late.

4-4. Example 4

Figure 12:
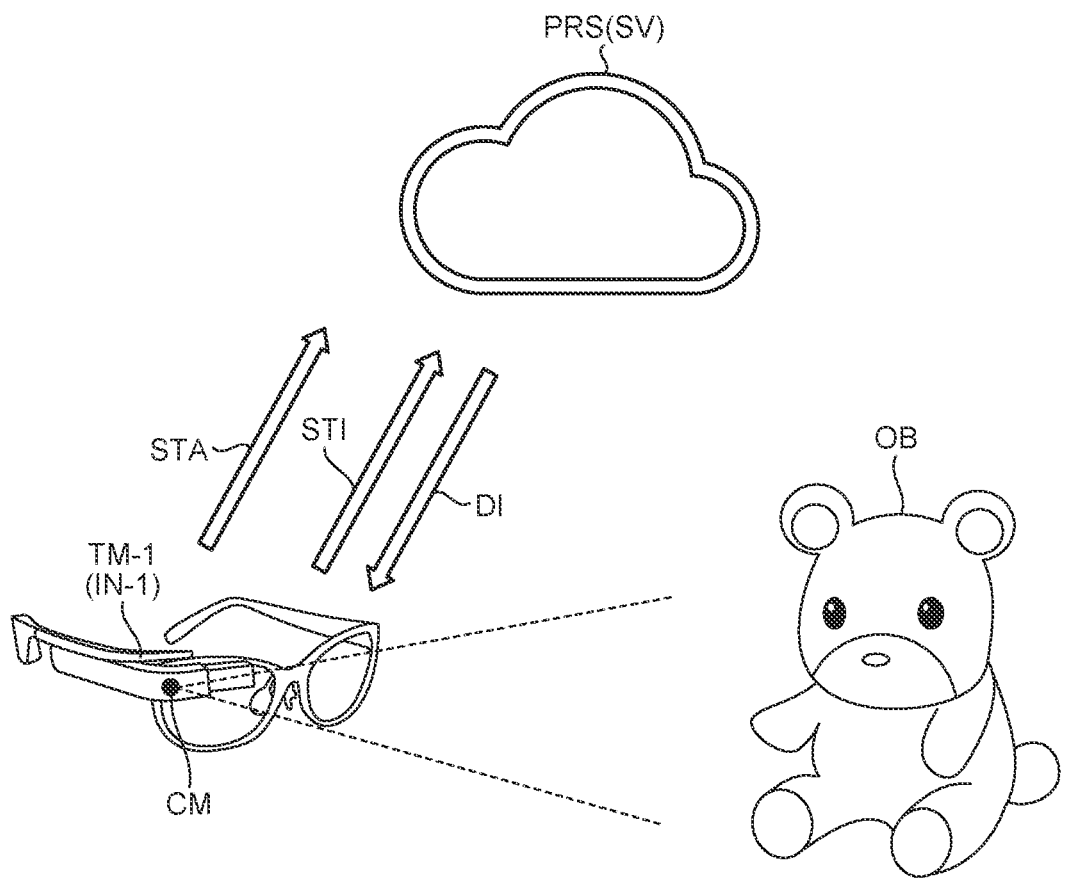
FIG. 12 is an explanatory diagram of Example 4.

FIG. 12 is an explanatory diagram of Example 4.

FIG. 12 illustrates a state in which a user (object IN) observes a virtual object OB (object IN) through AR glasses (terminal TM). The AR glasses can estimate its own position with high accuracy by the VPS. The AR glasses can display a plurality of AR worlds such as a "fantasy AR world" and a "cyberpunk AR world" by superimposing a virtual object OB on a real space.

In this case, there is a possibility that a real object, a virtual object OB of the fantasy AR world, and a virtual object OB of the cyberpunk AR world exist in the same space. In such a case, by specifying which AR world is activated, it is possible to operate the spatio-temporal address.

For example, the server SV comprehensively manages identification information of a real object and a virtual object OB. The processor PRS determines the queried position SPOS and the spatio-temporal address STA indicated by the queried time in the AR world. The processor PRS performs a specified action on the virtual object OB in the AR world with the Internet address DI corresponding to the specified spatio-temporal address STA.

For example, it is assumed that for a certain queried position SPOS, there is a car in the real world, a pumpkin coach in the fantasy AR world, and a robot in the cyberpunk AR world. In this case, by specifying the AR world and making an inquiry, it is possible to recognize the car when no AR world is activated, to recognize the pumpkin coach when the fantasy AR world is activated, and to recognize the robot when the cyberpunk AR world is activated.

4-5. Example 5

Figure 13:
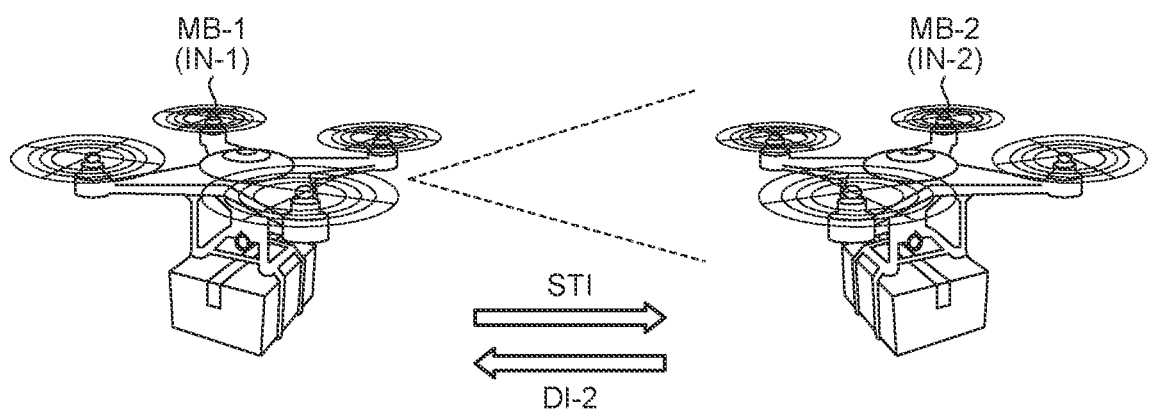
FIG. 13 is an explanatory diagram of Example 5.

FIG. 13 is an explanatory diagram of Example 5.

FIG. 13 illustrates an example in which automatic delivery of cargo is performed by the moving body MB (object IN). The object IN-1 is managed by the company A. The company A can recognize the position of the object IN-1 and instruct an operation. The object IN-2 is managed by the company B. The company B can recognize the position of the object IN-2 and instruct an operation.

The company A cannot recognize the position of the object IN-2 of the company B. For this reason, there is a concern that the objects IN may collide with each other, or the objects IN may try to anticipate behaviors of each other to avoid collision and cause congestion. At that time, if objects IN under the management of different systems can communicate with each other, it is possible to give way to each other in such a manner that "I will swerve in this way, so please swerve in that way", whereby smooth delivery is possible.

Each object IN has a highly accurate self-position estimation function such as a VPS used for automatic driving. In addition, each object IN registers information regarding the size of its own occupied space OS. In this case, each object IN can generate and manage its own identification information (spatio-temporal address STA, Internet address DI). Thus, the object IN-1 can obtain the internet address DI-2 of the object IN-2 on the basis of the query information STI and communicate with the object IN-2, so that the giving way as described above can be realized.

4-6. Example 6

Figure 14:
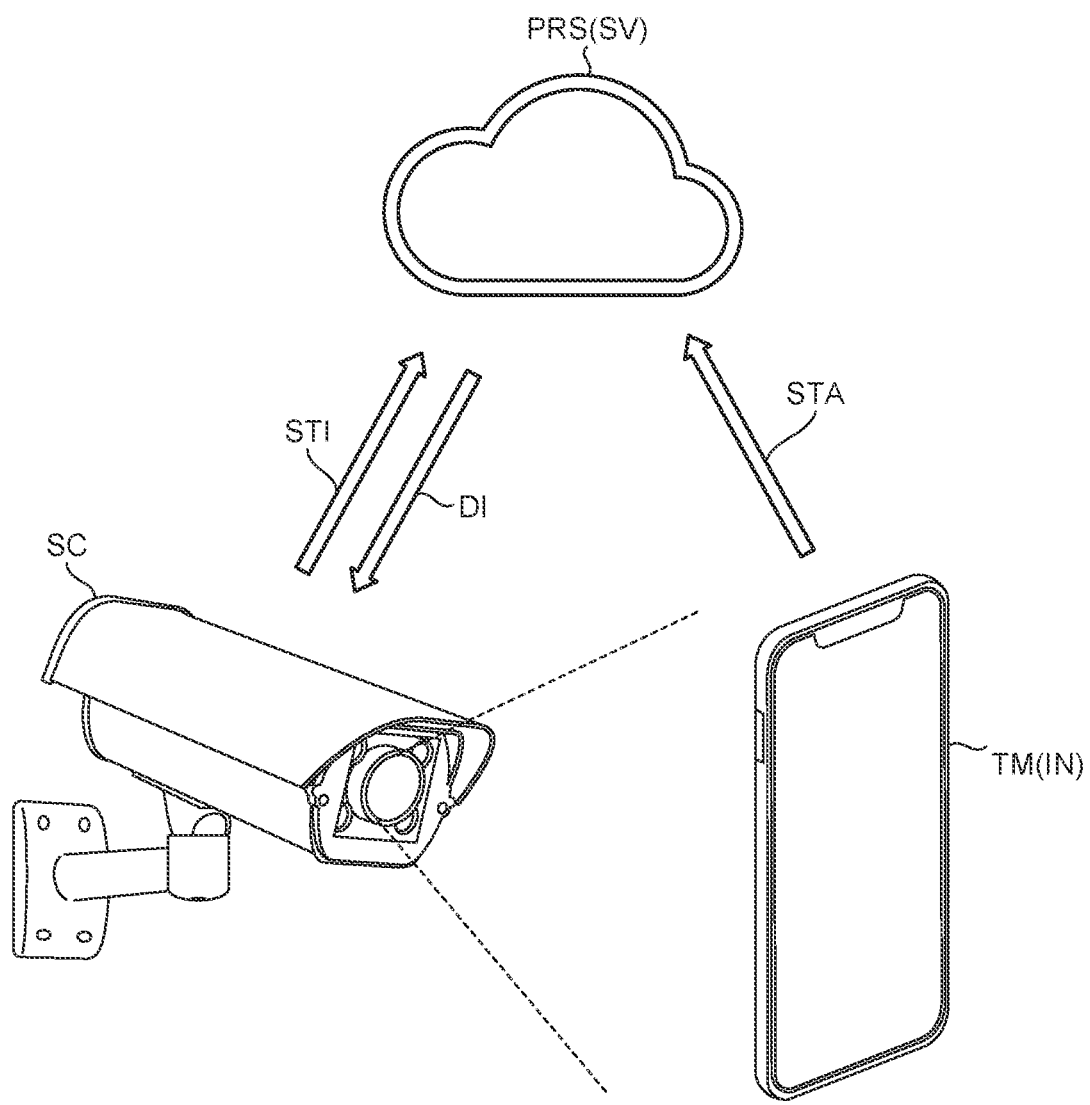
FIG. 14 is an explanatory diagram of Example 6.

FIG. 14 is an explanatory diagram of Example 6.

FIG. 14 illustrates how the monitoring camera SC monitors for a crime. The owner (object IN) of the smartphone (terminal TM) uses a life log service, and always registers the high-precision GPS records to the life log. The object IN happens to see an important scene of a crime, and a monitoring camera SC has captured the scene.

The position of the monitoring camera SC is fixed, and the absolute position of the monitoring camera SC is known. The absolute position of the person captured by the monitoring camera SC can also be estimated by analyzing the image captured by the monitoring camera SC. In addition, since the monitoring camera SC includes a time code, it is possible to generate the query information STI of the object IN captured by the monitoring camera SC by combining the information of the position and the time of the person.

The police inquires the life log companies whether there is a person having the spatio-temporal address STA corresponding to the query information STI. In accordance with a request from the police, each lifelog company searches whether there is a person having the spatio-temporal address STA corresponding to the query information STI. The company of the life log used by the object IN identifies the spatio-temporal address STA corresponding to the query information STI and the Internet address DI associated with the spatio-temporal address STA. The life log company checks contact information of the object IN with the identified internet address DI and informs the police. The police obtains the contact information of the object IN that could be an important witness.

5. EFFECTS

In the present disclosure, the spatio-temporal address STA of the object IN defined by the position and time at which the object IN exists is associated with the Internet address DI of the object IN.

According to this configuration, a general-purpose addressing method using a physical principle that "objects cannot exist at the same time at the same position in an overlapping manner" is provided.

The processor PRS determines the queried position SPOS and the spatio-temporal address STA indicated by the queried time. The processor PRS sends the Internet address DI associated with the specified spatio-temporal address STA to the inquirer.

According to this configuration, the Internet address DI of the object IN can be acquired by an inquiry in a simple format "the object existing at this time and this position".

The processor PRN sends the Internet address DI associated with the spatio-temporal address STTA to the inquirer when the queried position SPOS and the queried time indicate the spatio-temporal address STA of the object IN to which the processor PRN belongs.

According to this configuration, the internet address DI can be directly exchanged between the inquirer and the object IN.

The processor PRN communicates with the inquirer through the Internet address DI.

According to this configuration, inter-device communication can be performed with the object IN specified by the spatio-temporal information.

The processor PRS determines the queried position SPOS and the spatio-temporal address STA indicated by the queried time. The processor PRS sends the object-related information RI of the object IN with the Internet address DI associated with the identified spatio-temporal address STA to the inquirer.

According to this configuration, various information related to the object IN can be obtained using only the universal information of the position POS and the time at which the object IN exists.

The object-related information RI includes use information of a facility related to the object IN.

According to this configuration, the use information of the facility can be obtained directly from the spatio-temporal information of the facility without searching from the name or the like of the facility.

The processor PRS determines the queried position SPOS and the spatio-temporal address STA indicated by the queried time in the AR world. The processor PRS performs a specified action on the virtual object OB in the AR world with the Internet address DI corresponding to the specified spatio-temporal address STA.

According to this configuration, it is possible to directly specify an object by the spatio-temporal information and process an action.

The processor PRS acquires the position POS where the object IN exists as the occupied space OS having a predetermined size.

According to this configuration, the spatio-temporal address STA is defined with a spatial extent. Therefore, even if there is an error in the queried position SPOS, it is easy to specify the spatio-temporal address STA of the target object IN.

The processor PRS determines, as the queried position SPOS and the spatio-temporal address STA indicated by the queried time, a spatio-temporal address STA that includes the queried position SPOS in the occupied space OS at the queried time.

According to this configuration, the object IN is easily identified on the basis of the queried position SPOS and the queried time.

The processor PRS acquires the queried position SPOS as the search space SS having a predetermined size.

According to this configuration, the queried position SPOS is defined with a spatial extent. Therefore, even if there is an error in the queried position SPOS, it is easy to specify the spatio-temporal address STA of the target object IN.

The processor PRS specifies the spatio-temporal address STA while adjusting the size of the search space SS such that only a single spatio-temporal address STA is searched for from the search space SS on the basis of the user input information.

According to this configuration, even if another object IN exists nearby, the spatio-temporal address STA of the target object IN is accurately identified.

The processor PRS specifies one spatio-temporal address STA selected on the basis of the user input information from among the plurality of spatio-temporal addresses STA searched from the search space SS as the queried position SPOS and the spatio-temporal address STA indicated by the queried time.

According to this configuration, the spatio-temporal address STA of the target object IN is accurately identified on the basis of the user input information.

Note that the effects described in the present specification are merely examples and are not limiting, and other effects may be provided.

Supplementary Note

Note that the present technology can also adopt the following configurations.

(1)

An information processing device comprising a processor that associates a spatio-temporal address of an object defined by a position and a time at which the object exists with an Internet address of the object.

(2)

The information processing device according to (1), wherein the processor specifies the spatio-temporal address indicated by a queried position and a queried time, and sends the Internet address associated with the specified spatio-temporal address to an inquirer.

(3)

The information processing device according to (1), wherein the processor is further configured to, when a queried position and the queried time indicate the spatio-temporal address of the object to which the processor belongs, send the Internet address associated with the spatio-temporal address to an inquirer.

(4)

The information processing device according to (3), wherein the processor communicates with the inquirer via the Internet address.

(5)

The information processing device according to (1), wherein the processor identifies the spatio-temporal address indicated by a queried position and a queried time, and sends object-related information of the object with the Internet address associated with the identified spatio-temporal address to an inquirer.

(6)

The information processing device according to (5), wherein the object-related information includes use information of a facility related to the object.

(7)

The information processing device according to (1), wherein the processor is configured to determine a queried position in an AR world and the spatio-temporal address indicated by a queried time, and perform a specified action on a virtual object in the AR world with the Internet address corresponding to the determined spatio-temporal address.

(8)

The information processing device according to any one of (2) to (7), wherein the processor acquires the position at which the object exists as an occupied space having a predetermined size.

(9)

The information processing device according to (8), wherein the processor specifies the spatio-temporal address that includes the queried position in the occupied space at the queried time as the spatio-temporal address indicated by the queried position and the queried time.

(10)

The information processing device according to any one of (2) to (7), wherein the processor acquires the queried position as a search space having a predetermined size.

(11)

The information processing device according to (10), wherein the processor specifies the spatio-temporal address while adjusting a size of the search space so that only a single spatio-temporal address is searched for from the search space based on user input information.

(12)

The information processing device according to (10), wherein the processor specifies one spatio-temporal address selected based on user input information from a plurality of spatio-temporal addresses retrieved from the search space as the spatio-temporal address indicated by the queried position and the queried time.

(13)

An information processing method executed by a computer, comprising associating a spatio-temporal address of an object defined by a position and a time at which the object exists with an Internet address of the object.

(14)

A program for causing a computer to realize associating a spatio-temporal address of an object defined by a position and a time at which the object exists with an Internet address of the object.

REFERENCE SIGNS LIST

DI INTERNET ADDRESS
IN OBJECT (INFORMATION PROCESSING DEVICE)
OB VIRTUAL OBJECT
OS OCCUPIED SPACE
POS POSITION
PRN PROCESSOR
PRS PROCESSOR
RI OBJECT-RELATED INFORMATION
SPOS QUERIED POSITION
SS SEARCH SPACE
STA SPATIO-TEMPORAL ADDRESS
SV SERVER (INFORMATION PROCESSING DEVICE)
TM TERMINAL (INFORMATION PROCESSING DEVICE)

The invention claimed is:

1. An information processing device, comprising:
a memory; and
a processor configured to:
associate a spatio-temporal address of an object with an Internet address of the object, wherein
the associated spatio-temporal address indicates a time, and a position of the object at the time;
specify the associated spatio-temporal address based on query information, wherein the query information indicates a queried position and a queried time; and
send the Internet address associated with the specified spatio-temporal address to an inquirer.

2. The information processing device according to claim 1, wherein
the spatio-temporal address is associated with the processor.

3. The information processing device according to claim 2, wherein the processor is further configured to communicate with the inquirer via the Internet address.

4. The information processing device according to claim 1, wherein the processor is further configured to:
identify the associated spatio-temporal address based on the query information; and
send object-related information with the Internet address to the inquirer, wherein each of the object-related information and the Internet address is associated with the identified associated spatio-temporal address.

5. The information processing device according to claim 4, wherein the object-related information includes use information of a facility related to the object.

6. The information processing device according to claim 1, wherein the processor is further configured to:
  determine the queried position and the specified spatio-temporal address in an augmented reality (AR) world; and
  control a virtual object in the AR world, wherein the virtual object is associated with the Internet address corresponding to the determined spatio-temporal address.

7. The information processing device according to claim 1, wherein the processor is further configured to acquire the position of the object as an occupied space having a specific size.

8. The information processing device according to claim 7, wherein
  the queried position corresponds to a position in the occupied space at the queried time.

9. The information processing device according to claim 1, wherein the processor is further configured to acquire the queried position as a search space having a specific size.

10. The information processing device according to claim 9, wherein
  the search space includes a plurality of associated spatio-temporal addresses,
  the plurality of associated spatio-temporal addresses includes the associated spatio-temporal address,
  the processor is further configured to adjust the specific size of the search space based on user input information, and
  the search space with the adjusted specific size includes one of the plurality of associated spatio-temporal addresses.

11. The information processing device according to claim 9, wherein
  the search space includes a plurality of associated spatio-temporal addresses,
  the plurality of associated spatio-temporal addresses includes the associated spatio-temporal address, and
  the processor is further configured to specify the associated spatio-temporal address, based on user input information and the query information.

12. An information processing method executed by a computer, comprising:
  associating a spatio-temporal address of an object with an Internet address of the object, wherein
    the associated spatio-temporal address indicates a time and a position of the object at the time;
  specifying the associated spatio-temporal address based on query information, wherein the query information indicates a queried position and a queried time; and
  sending the Internet address associated with the specified spatio-temporal address to an inquirer.

13. A non-transitory computer-readable medium having stored thereon, computer-executable instructions that, when executed by a computer, causes the computer to execute operations, the operations comprising:
  associating a spatio-temporal address of an object with an Internet address of the object, wherein
    the associated spatio-temporal address indicates a time and a position of the object at the time;
  specifying the associated spatio-temporal address based on query information, wherein the query information indicates a queried position and a queried time; and
  sending the Internet address associated with the specified spatio-temporal address to an inquirer.

* * * * *